(12) United States Patent
Warner (10) Patent No.: US 7,425,030 B2
(45) Date of Patent: Sep. 16, 2008

(54) TARPAULIN FOR VARIABLE SIZED LOADS

(75) Inventor: Larry D. Warner, Libertyville, IA (US)

(73) Assignee: Roberts and Dybdahl, Inc., West Des Moines, IA (US)

( * ) Notice: Subject to any disclaimer, the term of this patent is extended or adjusted under 35 U.S.C. 154(b) by 164 days.

(21) Appl. No.: 11/551,031

(22) Filed: Oct. 19, 2006

(65) Prior Publication Data

US 2008/0093878 A1    Apr. 24, 2008

(51) Int. Cl.
*B60J 7/00* (2006.01)
(52) U.S. Cl. .............................. 296/100.13; 296/100.11
(58) Field of Classification Search ............ 296/100.11, 296/100.13
See application file for complete search history.

(56) References Cited

U.S. PATENT DOCUMENTS

| 4,281,872 A | 8/1981 | Biancale |
| 4,583,777 A | 4/1986 | Myburgh |
| 6,183,036 B1 | 2/2001 | Coulson |
| 6,655,726 B2 | 12/2003 | Bergeron |
| 6,877,794 B2 | 4/2005 | Bush, Sr. |
| 6,896,312 B2 | 5/2005 | Talbot |

OTHER PUBLICATIONS

Exhibit I, Declaration of Larry D. Warner to Accompany Information Disclosure Statement—four photographs of tarpaulin, taken Sep. 2002.

*Primary Examiner*—Joseph D Pape
(74) *Attorney, Agent, or Firm*—McKee, Voorhees & Sease, P.L.C.

(57) ABSTRACT

A tarpaulin for a quick and safe covering of a load on a truck or trailer bed is provided having a post positioned at each corner of the bed including a pulley mounted on top of each post at the front of the bed. A pair of cables are each anchored at one end to an extensible cable holder, trained over the pulley and removably attached to the post on the back of the bed. The system and method includes a U-shaped tarpaulin using a plurality of eyes or pulleys for slidably connecting to the cables for covering the load positioned on the bed. The tarpaulin may be removed from all or part of the load. The system and method also includes independent extensible cable holders for lengthening and shortening each cable to lower and raise the tarpaulin.

21 Claims, 8 Drawing Sheets

TARPAULIN FOR VARIABLE SIZED LOADS

BACKGROUND OF THE INVENTION

Trailers and trucks for transporting freight are an integral part of commerce. These trucks and trailers vary in type and configuration. One common type of truck and trailer is the enclosed cargo style. Some trucks and trailers have gone to using a partially open structure permitting the truck or trailer to be loaded from the top. Other trucks or trailers are configured to be an open trailer and inherently are convenient for loading and unloading purposes. Additionally, open trailers are generally lighter than their counterparts, the partially enclosed or fully enclosed trailers. Thus, open trailers provide more load carrying capacity.

To protect the cargo on an open trailer, tarpaulins have traditionally been used to cover the load. In times past, this involved the driver climbing to the top of the load to help distribute the tarpaulin evenly across the load. This method exposed the driver to possible physical harm as well as requiring substantial amounts of time to properly place and secure the tarpaulin over the load. Moreover, uneven loads further complicated this method of applying the tarpaulin.

Currently, attempts have been made to provide a system for applying a tarpaulin to a load on a truck or a trailer. These systems are bulky, complex and difficult for the operator to use. In particular, many of the present tarpaulin systems essentially convert an open trailer to a fully enclosed trailer. These systems include unnecessary weight, components and structure for supporting the system. Additionally, these systems do not allow the driver to quickly uncover and unload only portions of the load at a time.

Thus, there is a long standing and continuing need for a tarpaulin system for covering the load on a truck and/or trailer that is easy to operate, limited in weight and quickly retractable to unload a portion of the freight. Additionally, there is also a need for a tarpaulin system that is simple and uncomplicated to operate and use, yet rugged. There is also a need for a tarpaulin system for covering the load that does not significantly add to the weight of the trailer.

BRIEF SUMMARY OF THE INVENTION

Therefore it is a primary object, feature and advantage of the present invention to improve over the state of the art by providing a tarpaulin system for covering a load on a truck and/or a trailer that is easily configured to meet the needs of any setting and/or application.

It is a still further object, feature or advantage of the present invention to provide a tarpaulin system for covering the load on an open trailer.

Another object, feature or advantage of the present invention is to provide a tarpaulin system for fully covering partial loads on the truck and/or trailer.

Still another object, feature or advantage of the present invention is to provide a tarpaulin system having the advantages of an open trailer yet protecting the load like a partially or fully enclosed trailer.

Yet another object, feature or advantage of the present invention is to provide a tarpaulin system that is simple and uncomplicated to operate and use.

A further object, feature or advantage of the present invention is to provide a tarpaulin system that is rugged, yet lightweight and does not significantly add to the axle weight of the truck and/or trailer.

It is a further object, feature or advantage of the present invention to provide a tarpaulin system wherein the driver can cover the load while remaining on the ground.

Another object, feature or advantage of the present invention is to provide a tarpaulin system for covering the entire load on the trailer without decreasing the carrying capacity of the trailer or truck.

Yet another object, feature or advantage of the present invention is to provide a tarpaulin system wherein a portion of the load may be unloaded from the truck and/or trailer without fully removing the tarpaulin.

A still further object, feature or advantage of the present invention is to provide a tarpaulin system having a U-shaped tarpaulin for simultaneously covering the top and sides of the load on the trailer or truck.

Another object, feature or advantage of the present invention is to provide a tarpaulin system having a light weight headboard for stowing away the tarpaulin.

Yet another object, feature or advantage of the present invention is to provide a tarpaulin system using only a pair of cables strung across the bed of the truck or trailer for covering the load using a tarpaulin.

A further object, feature or advantage of the present invention is to provide a tarpaulin system having posts positioned at the four corners of the bed of the truck or trailer.

Another object, feature or advantage of the present invention is to provide a tarpaulin system wherein each cable is independently lengthened and shortened using separate extensible cable holders or winches.

Yet another object, feature or advantage of the present invention is to provide a tarpaulin system wherein a self-braking crank is used to raise and lower the front posts positioned on the bed.

A still further object, feature or advantage of the present invention is to provide a tarpaulin system wherein the self-braking crank has a nut secured to the handle and threaded on a shaft for driving a rack positioned on the extensible front posts using a pinion.

A further object, feature or advantage of the present invention is to provide a tarpaulin system wherein the self-braking crank handle has a plurality of friction discs positioned on the shaft which are tightened and compressed together by the nut secured to the crank handle when positioning the extensible posts at the front of the bed.

Another object, feature or advantage of the present invention is to provide a tarpaulin system wherein the cables are positioned above the load and the tarpaulin is lowered down upon the load for quickly and safely covering the load.

A further object, feature or advantage of the present invention is to provide a tarpaulin system wherein the rear posts are adapted for raising the cable above the load.

Yet another object, feature or advantage of the present invention is to provide a tarpaulin system wherein posts positioned on the rear of the bed have holes along the length of the post for removably securing the cables thereto at a height above the load.

A still further object, feature or advantage of the present invention is to provide a tarpaulin system wherein a clasp having a locking pin is adjustable along the height of the rear posts using holes spaced in and along the post to adjust the height of the cable.

According to one aspect of the present invention, a tarpaulin system for quick and safe covering of a load on a truck or trailer bed having a front and opposite back end is disclosed. The system has a post positioned at each corner of the bed. In addition, a pulley mounted on top of each post at the front of the bed. A pair of cables are each anchored at one end to an extensible cable holder, trained over the pulley, and removably attached to the post on the back of the bed. Also, the system includes a U-shaped tarpaulin having a plurality of eyes for slidably connecting to the cables in a covering position over the load or a stowed position.

According to another feature of the present invention, each post on the front of the bed further comprises a fixed member for attaching to the bed and a telescoping member with a rack for positioning the telescoping member attached thereto.

According to another feature of the present invention, a self-braking crank with a handle having a shaft and a pinion attached thereto for driving the rack and extending the telescoping member relative to the fixed member.

According to another feature of the present invention, the self-braking crank further comprises a nut secured to the handle and threaded onto the shaft and a plurality of friction discs mounted on the shaft, such that the discs are compressed together by the nut to brake the handle when positioning the telescoping member.

According to another feature of the present invention, the telescoping member on the front of the bed further comprises a plurality of holes spaced along the member for receiving a bolt of a safety latch pin attached to the fixed member.

According to another feature of the present invention, each post on the back of the bed further comprise a plurality of holes spaced along the post for receiving a sliding latch pin.

According to another feature of the present invention, one end of each cable is removably connected at the back of the bed to the sliding latch pin.

According to another feature of the present invention, a headboard is positioned between the posts on the front of the bed. The headboard having a shelf for holding the tarpaulin in the stowed position.

According to another feature of the present invention, a pair of extensible cable holders are used for independently lengthening and shortening the pair of cables.

According to another aspect of the present invention, a tarpaulin system for quick and safe covering of a load on a truck or trailer bed having a front and opposite back end is disclosed. The system includes a first pair of extensible posts positioned at each corner of the front of the bed for raising the post to a first position above the load. The system also includes a first and second cable each anchored at the front end of the bed to an extensible cable holder. The first and second cable are trained over a pulley atop each post and removably secured to a second pair of posts on the back of the bed. The system includes as well a U-shape tarpaulin having a plurality of eyes for slidably connecting to the cables in a covering position over the load or a stowed position. The extensible cable holder is used for lowering each cable and the tarpaulin to a second position below the first position of the post for draping the tarpaulin over the load.

According to another feature of the present invention, each post on the front of the bed further comprises a fixed member for attaching to the bed and a telescoping member with a rack attached thereto.

According to another feature of the present invention, the tarpaulin system uses a self-braking crank with a handle having a shaft and pinion attached thereto for driving the rack and extending the telescoping member relative to the fixed member to the first position above the load.

According to another feature of the present invention, the self-braking crank further comprises a nut secured to the handle and threaded onto the shaft and a plurality of friction discs mounted on the shaft. The discs being compressed together by the nut to brake the handle when rotating the handle to position the telescoping member.

According to another feature of the present invention, the first cable is connected to and independently driven by a first extensible cable holder and the second cable is connected to and independently driven by a second extensible cable holder.

According to another feature of the present invention, the first cable and/or the second cable being raised from the second position to the first position for lifting at least a portion of the tarpaulin off of the load for uncovering at least some of the load.

According to another feature of the present invention, the U-shaped tarpaulin further comprises side raiser ropes for raising at least one side of the tarpaulin for accessing and removing the load from the bed.

According to another aspect of the present invention, a method for quick and safe covering and uncovering of a load on a truck or trailer bed having and front and opposite back end using a tarpaulin, is disclosed. The method includes providing a post positioned at each corner of the bed. The method also includes mounting a pulley atop of each extensible post at the front of the bed. Included as well in the method is anchoring a pair of cables at one end to an extensible cable holder. Training the cables over the pulley and removably attaching the cables to the posts on the back of the bed. The method includes as well raising each post above the load. The method also includes sliding a U-shaped tarpaulin having a plurality of eyes for connecting to the cables to a covering position over the load. The method includes additionally, lowering the cables below the extensible posts for resting the tarpaulin on top of the load in covering relation to the load.

According to another feature of the present invention, includes raising at least one of the cables above the load for lifting the tarpaulin off of the load.

According to another feature of the present invention, includes raising at least one side raiser rope associated with the tarpaulin for uncovering, accessing and removing at least some of the load from the bed.

According to another feature of the present invention, includes raising and lowering each cable independent of the other using separate extensible cable holders.

DETAILED DESCRIPTION OF THE PREFERRED EMBODIMENT

Figure 1:
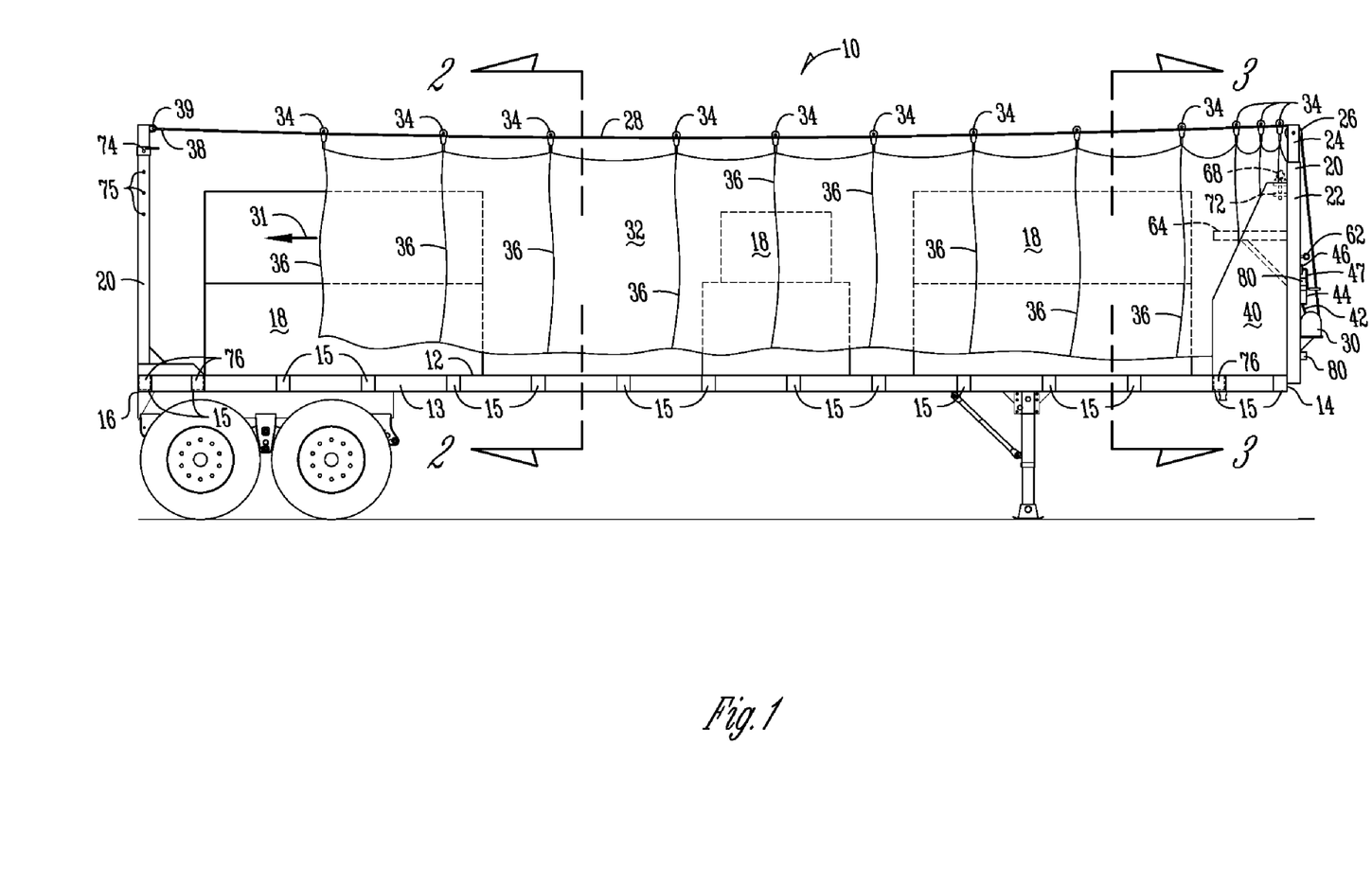
FIG. 1 is a side view of the present invention.
Figure 2:
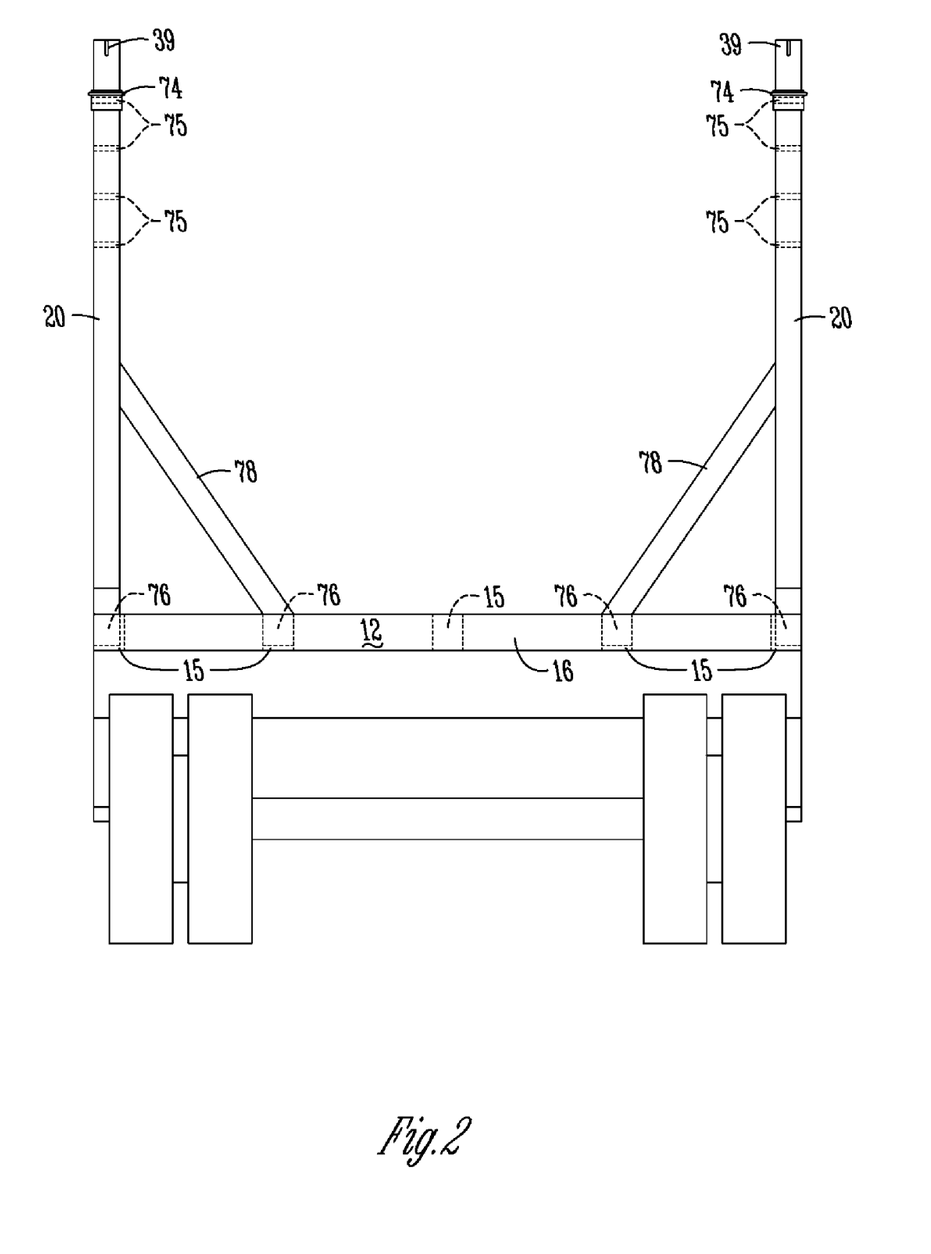
FIG. 2 is a sectional view taken along line 2-2 of FIG. 1.

The tarpaulin system of the present invention is generally designated in the drawings by the reference numeral 10. The tarpaulin system 10, as shown in FIG. 1, includes a transportable bed 12. The transportable bed 12 may be a trailer bed or a truck bed or any bed used for transferring freight. The bed 12 shown in FIG. 1 is preferably the bed associated with an open trailer or a flatbed on the back of a truck. The bed 12 has a front end 14 and a back end 16. The bed 12 also has a railing 13 along its edges having notches 15 evenly spaced therein. A post 20 is positioned at each corner of the bed 12. Each post 20 at the front 14 of the bed 12 is connected to the headboard 40. The headboard 40 and post 20 at the front 14 of the bed 12 are positioned on the bed 12 using support legs 76. The support legs 76 are adapted to fit inside of the notches 15 within the railing 13 of the bed 12. The posts 20 on the front 14 of the bed 12 consist of a fixed member 22 and a telescoping member 24. The telescoping member 24 raises and lowers relative to the fixed member 22. On each telescoping member 24 at the front 14 of the bed 12 is mounted a pulley 26. The pulley 26 is rotatably mounted to the telescoping member 24 of the post 20. A self-braking crank 46 with handle 47 is provided for raising and lowering the telescoping member 24 relative to the fixed member 22 of the post 20. A safety latch pin 62 is also provided and positioned on the post 20 for locking the telescoping member 24 in a fixed position. An extensible cable holder 30 is mounted on both sides of the headboard 40. A separate extensible cable holder 30 is dedicated for each cable 28 and lengthens and shortens the cables 28 independent of each other. It is preferred that the extensible cable holder 30 be an electric powered winch. The extensible cable holder 30 may also be a manually driven winch. The extensible cable holder 30 as shown in FIG. 1 is connected to an electrical box 44 using power cables 42. The electrical box 44 is adapted for connecting to a power source. The power source may be associated with a truck (not shown) or some other power providing source. Steps 80 are provided on the headboard 40 for climbing the headboard 40 and accessing the latch pin 62 and other members positioned on the headboard 40. A cable 28 is also provided and anchored at one end to the extensible cable holder 30. The cable 28 is trained over the pulley 26 and attached at its opposite end to post 20 at the back 16 of the bed 12. The cable 28 is attached to the post 20 at the back end 16 of the bed 12 using a releasable catch 38 positioned through a receiver loop 39 connected to the post 20. The releasable catch 38 is preferably a carabineer or hook. It is understood that any hooking and releasable member constitutes a releasable catch. The post 20 on the back 16 of the bed 12 is configured with support legs 76 for inserting into notches 15 along the rail portion 13 of the bed 12. The post 20 on the back 16 of the bed 12 is also configured with a plurality of holes 75 for receiving a sliding latch pin 74. The sliding latch pin 74 is adjustable along the length of the post 20 using the plurality of holes 75, as shown also in FIG. 2. The releasable catch 38 at the end of the cable 28 may be connected to the loop 39 or to the sliding latch pin 74. The sliding latch pin 74 allows the user to adjust the height of the cable 28 along the length of the post 20. Thus, in the case where a load 18 positioned on the bed 12 is significantly lower in height than the height of the post 20, the user may connect the cable 28 using the releasable catch 38 to the sliding latch pin 74 and adjust the height of the cable 28 with respect to the load 18 using the holes 75 along the length of the post 20. As illustrated in FIG. 2, the post 20 positioned on the back end 16 of the bed 12 are supported laterally by support members 78. Support members 78 are attached to the post 20 on the back end 16 of the bed 12. The lateral support member 78 also have support legs 76 on their opposite ends for inserting into notches 15 within the railing 13 of the bed 12.

Using a series or a plurality of eyes 34, a U-shaped tarpaulin 32 is slidably connected to each cable 28 extending along both sides of the bed 12 from the front 14 to the back end 16. It is preferred that the eyes 34 are pulleys for moving the U-shape tarpaulin 32 along the length of the cable 28. However, an eyelet or slidable member could also be used for connecting the tarpaulin 32 to the cable 28. The U-shape tarpaulin is configured of two sides and a top and is unitary. The U-shape tarpaulin is attached at its upper edges to the eyes 34 for sliding along the length of the cable 28. The U-shape tarpaulin also has side raiser ropes 36 evenly spaced along its length for raising a portion or all of one side with respect to the same or opposite side. Thus, the U-shape tarpaulin 32 may be moved from a stowed position 33 within the headboard 40 (see FIG. 3) to a covering position 31 (see FIGS. 1, 7 and 8) over the top of the load 18.

Figure 3:
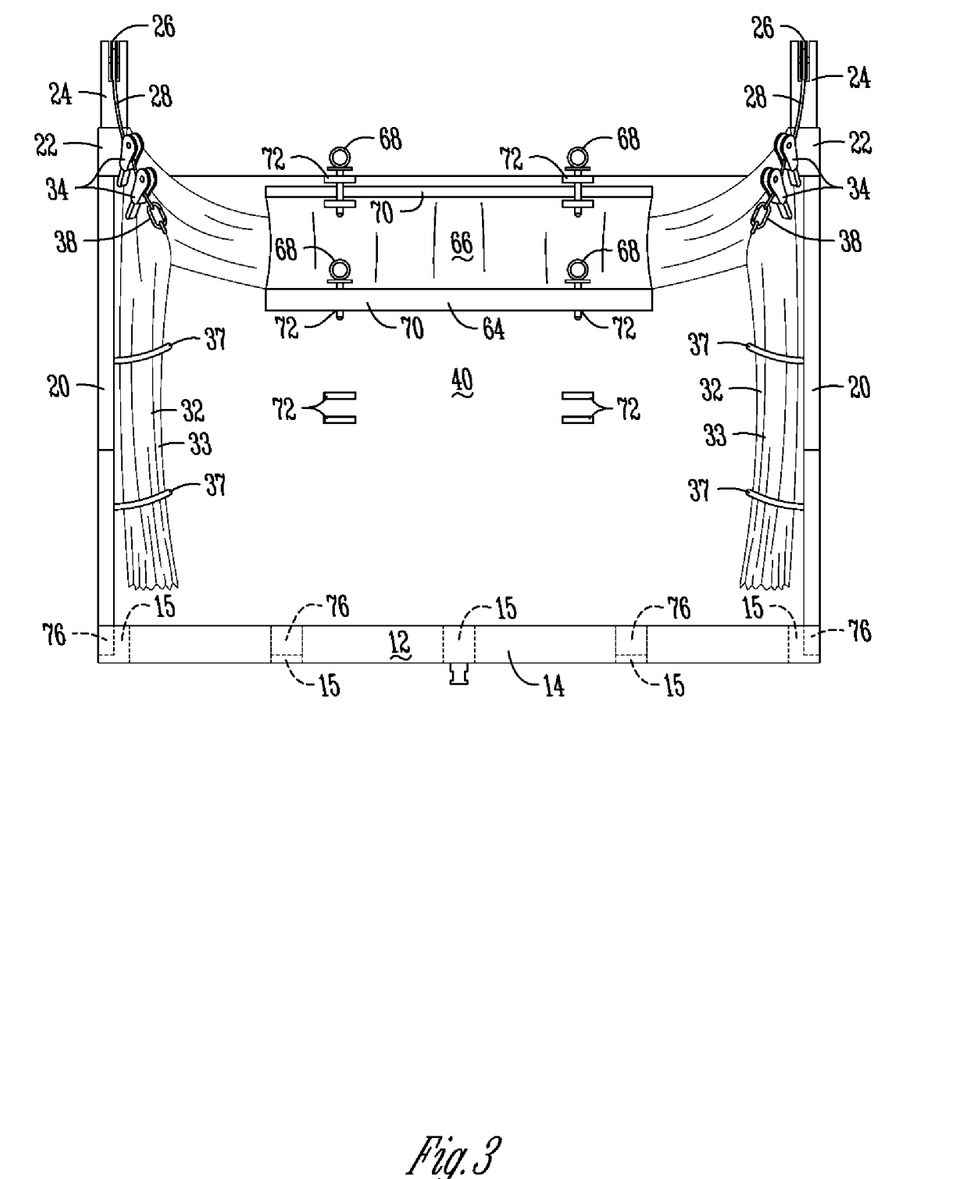
FIG. 3 is a sectional view taken along line 3-3 of FIG. 1.

As best illustrated in FIG. 3, in the stowed position 33, the U-shape tarpaulin 32 rests upon the tarpaulin storage shelf 64 positioned on the headboard 40. A set of retaining brackets 72 and retaining pins 68 are provided on the headboard 40. A weather cover 66 is also provided having a pair of retaining rods 70 for securing the weather cover 66 using the retaining brackets 72 and the retaining pins 68. The weather cover 66 has a retaining rod 70 positioned at both ends. The retaining rod 70 is secured between retaining brackets 72 and retained within the retaining brackets 72 using retaining pins 68. Thus, in the stowed position 33, the U-shape tarpaulin 32 is positioned against the headboard 40 and on the tarpaulin storage shelf 64 as well as covered and retained on the shelf 64 using the weather cover 66. The U-shape tarpaulin 32 is secured to the headboard 40 using straps 37 and weather cover 66. Thus, in the stowed position 33, the U-shape tarpaulin 32 is received within and stowed away in the headboard 40.

Figure 4:
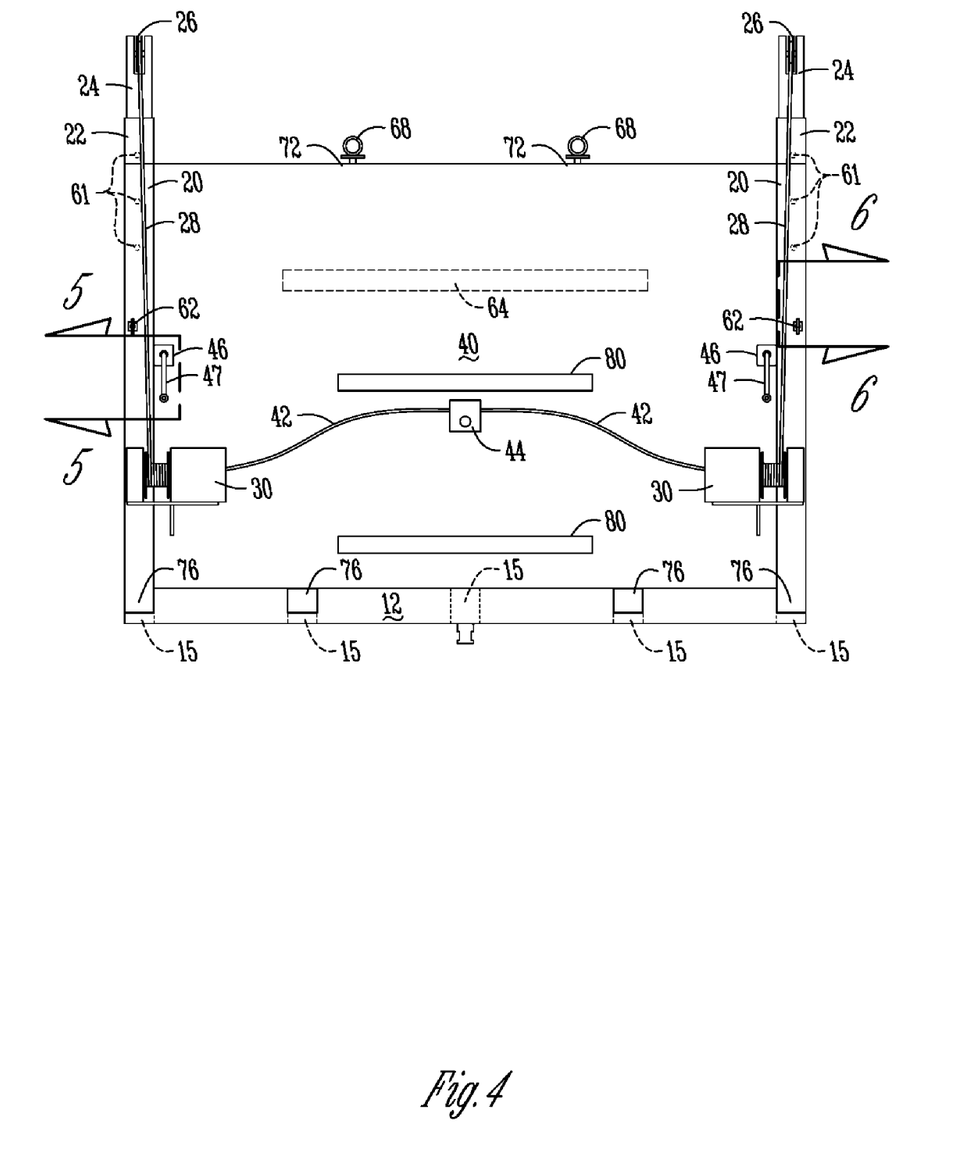
FIG. 4 is a front view of the present invention.

The headboard 40 is further illustrated in FIG. 4. As noted earlier, the headboard 40 is fitted with steps 80. The steps 80 allow the user to access the front of the headboard 40 and all the members positioned on the headboard 40. Thus, the user may use the steps 80 for positioning him or herself near the crank 46 and handle 47 on the headboard 40. A safety latch pin 62 is also provided on the post 20 for securing the telescoping member 24. Moreover, the user may access the latch pins 62, retaining pins 68, telescoping members 24, pulleys 26 and cables 28.

Figure 5:
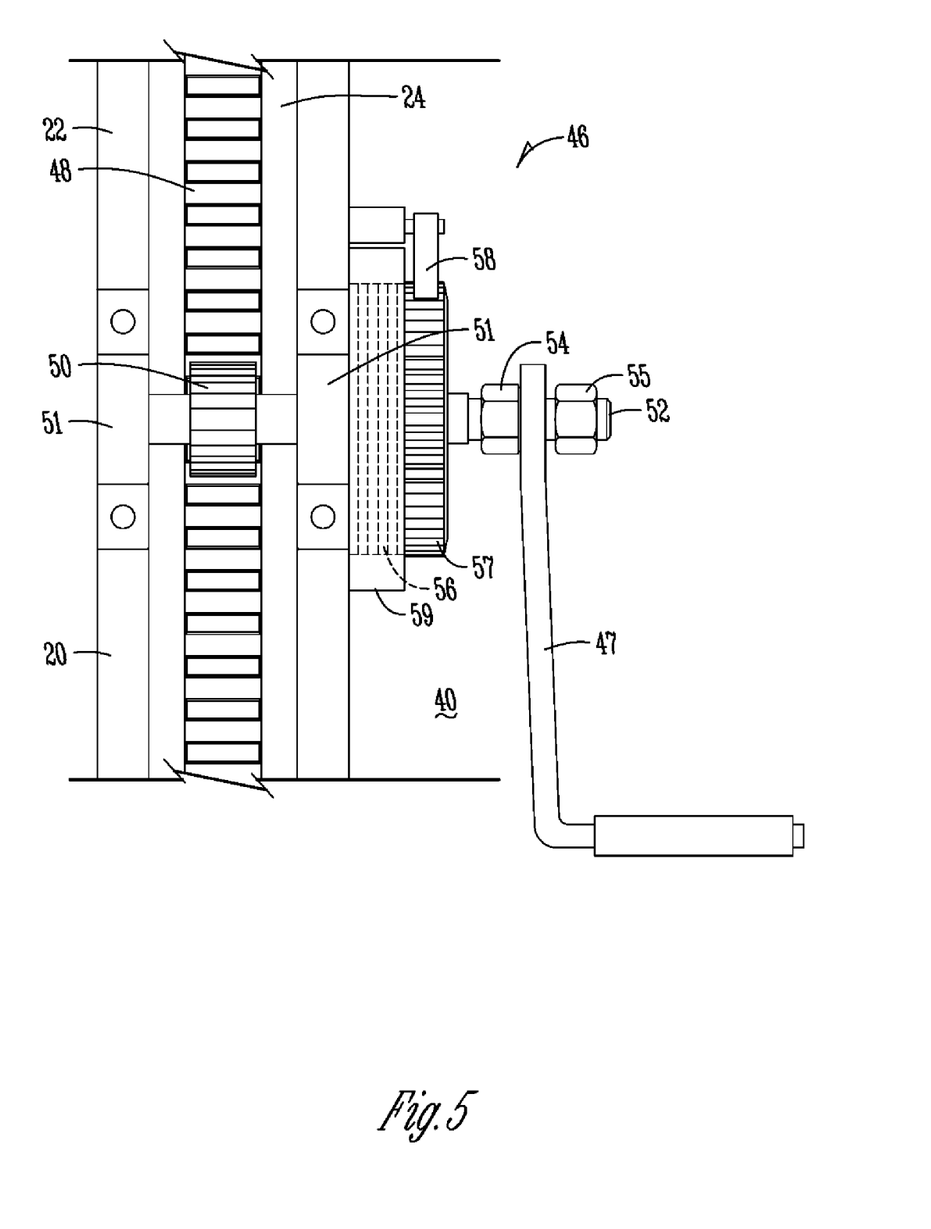
FIG. 5 is a sectional view taken along line 5-5 in FIG. 4.

The self-braking crank 46 and handle 47 is used to raise and lower the telescoping member 24 of the post 20 relative to the fixed member 22. The self-braking crank 46 is further diagramed in FIG. 5. FIG. 5 shows the various components that make up the self-braking crank 46. The self-braking crank 46 operates manually using the handle 47 attached to the threaded nut 54. The threaded nut 54 and the attached handle 47 are threaded onto the shaft 52. The shaft 52 is secured to the post 20 using bearings 51. A plurality of friction discs 56 are positioned on the shaft 52 with the hollow disc 59 between the bearing 51 and the gear 57. The gear 57 is also positioned on the shaft 52 between the hollow disc 59 and the plurality of friction discs 56 and the threaded nut 54. The gear 57 is adapted for use with the anti reverse lock 58. A self locking nut 55 is used to secure the handle 47, the gear 57, the hollow disc 59 and the plurality of friction discs 56 on the shaft 52. The self locking nut 55 prevents the threaded nut with the attached handle 47 from coming off of the shaft 52. Also, positioned on the shaft 52 between the two bearings 51 is a pinion 50. The pinion 50 is used to drive the rack 48. The rack 48 is secured to the telescoping member 24. To raise the height of the telescoping member 24 the handle 47 is turned counterclockwise. Alternatively, the handle 47 is turned clockwise for lowering the telescoping member 24. As the handle 47 is turned counterclockwise, nut 54 threads along the shaft 52 and the friction disc 56 are either compressed together or loosened. If the shaft 52 uses right-hand threads, the nut 54 tightens and compresses the friction discs 56 creating a braking action or resistance when the handle 47 is turned clockwise. Alternatively, using left-hand threads the nut 54 threads away from and allows the friction discs to be uncompressed disengaging the braking action or resistance when the handle 47 is turned clockwise. Moreover, turning the handle 47 with attached nut 54 clockwise on a left hand threaded shaft 52 would invoke the braking action when the telescoping member 24 is raised. Conversely, counterclockwise movement of the handle 47 and attached nut 54 on a left hand thread shaft 52 would gradually release the braking action when the telescoping member 24 is lowered. This braking action or stiffness in turning the handle 47 prevents the weight of the telescoping member 24, the pulley 26 and the cable 28 with attached tarpaulin 32 from free spinning the crank handle 46 out of the user's hands. The self-braking crank 46 also allows the user to manage the weight of the telescoping member 24, the pulley 26, and the cable 28 and attached U-shaped tarpaulin 32 while positioning the telescoping member 24 relative to the fixed member 22.

Figure 6:
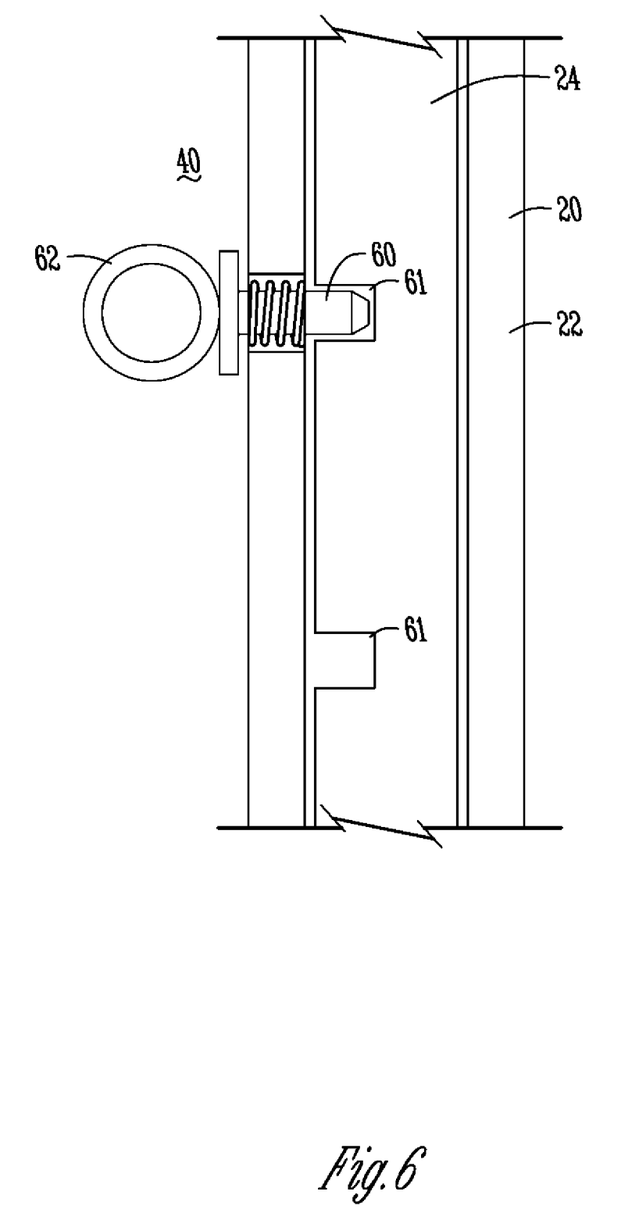
FIG. 6 is a sectional view taken along line 6-6 in FIG. 4.

A safety latch pin 62 is also provided on the post 20 for securing the telescoping member 24. As best illustrated in FIG. 6, the telescoping member 24 is fitted with a plurality of latch pin receiving holes 61 spaced along the length of the telescoping member 24. These latch pin receiving holes 61 receive the bolt 60 portion of the safety latch pin 62 for securing the telescoping member 24 against movement. The safety latch pin 62 is spring loaded. The safety latch pin 62 may be locked in an open or closed position. The open position being where the bolt 60 is withdrawn from the latch pin receiving hole 61. Conversely the close position being where the safety latch pin 62 is released and the bolt 60 is allowed to extend into the latch pin receiving hole 61. To engage the safety latch pin 62, the user moves the telescoping member 24 when the latch pin 62 is in the released/closed position. The bolt 60 will snap into the first latch pin receiving hole 61 it comes across.

Figure 7:
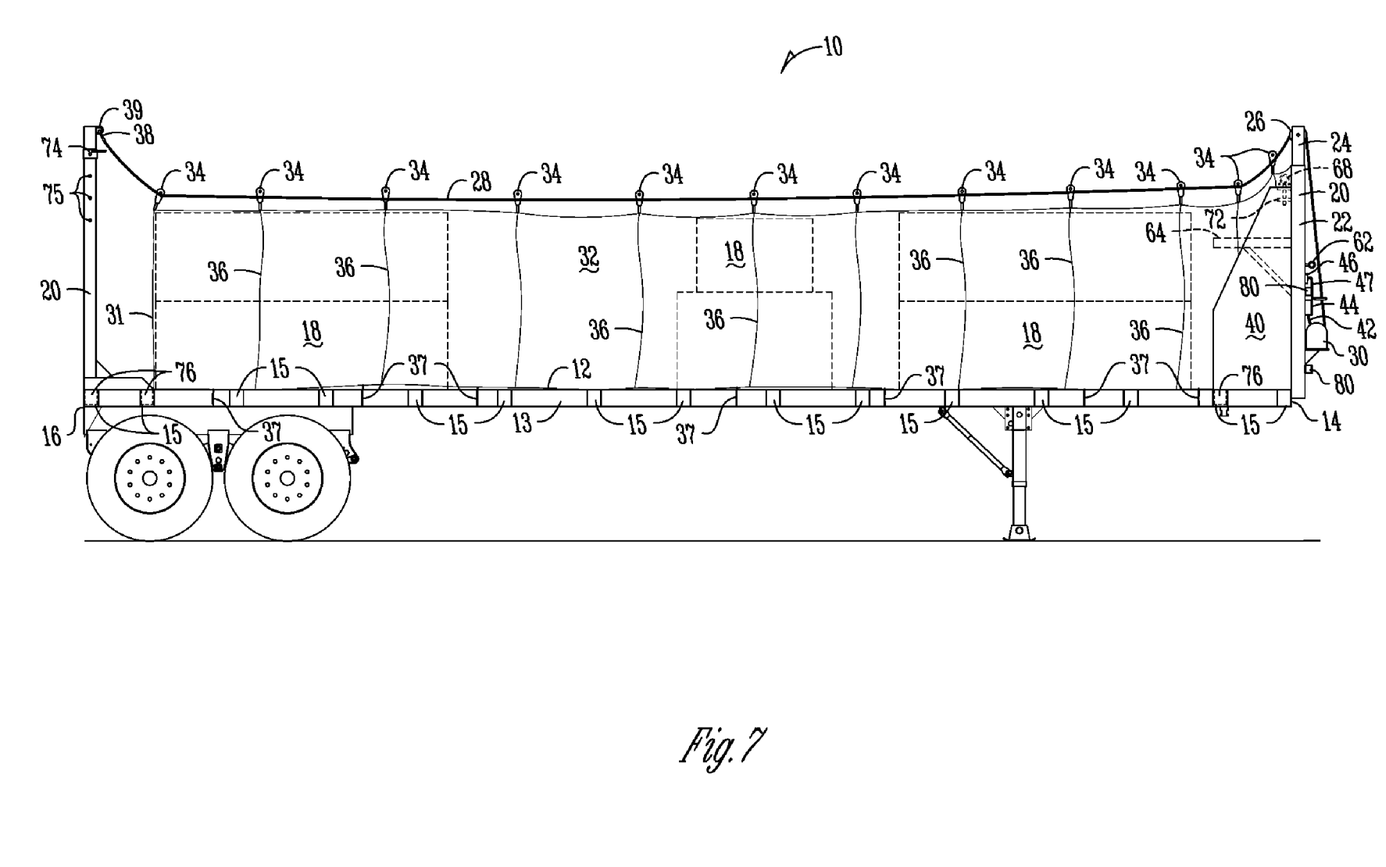
FIG. 7 is another side view of the present invention.
Figure 8:
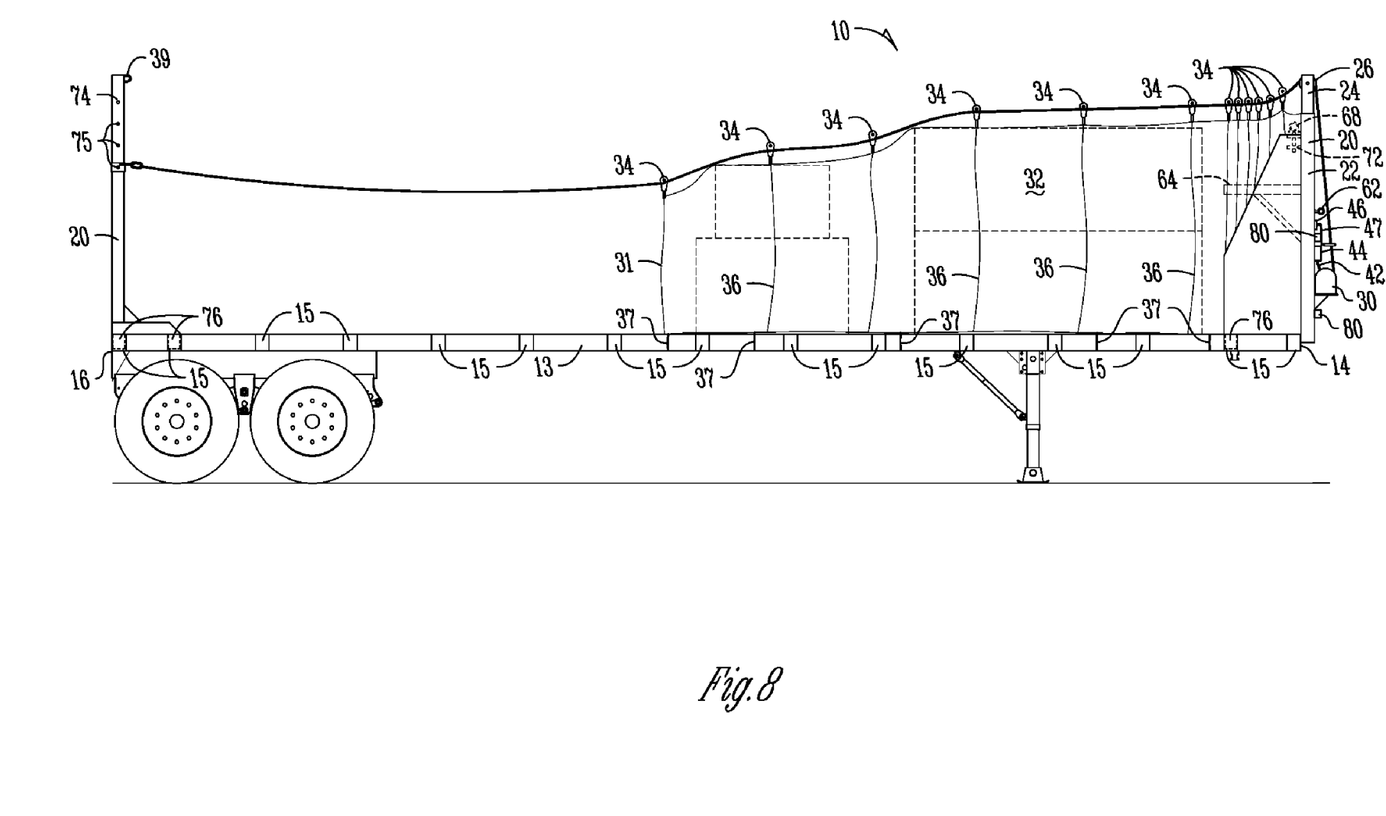
FIG. 8 is still another side view of the present invention.

FIG. 7 illustrates one method of using the tarpaulin system for quickly and safely covering a load and uncovering all or a portion of the load for unloading at a single destination or multiple destination/delivery points. While the U-shape tarpaulin 32 is in the stowed position 33 (as shown in FIG. 3), a load 18 is positioned on the bed 12. The load 18 may occupy the full length of the bed 12 or only a portion of the bed 12 or may be uneven consisting of portions of the load 18 being positioned near the front end 14 of the bed 12 or conversely near the back end 16 of the bed 12. The load 18 may be only a partial load using only a portion of the bed 12 and having space between the load 18 from the front 14 and back end 16 of the bed 12. The load 18 may be of irregular shapes and sizes and of uneven height across the length of the bed 12. In any case, the load 18 is secured to the bed 12. If the tarpaulin system 10 is being used on a trailer bed 12, the trailer 12 is attached to a truck (not shown). Electrical power from the truck is connected to the electrical box 44 on the headboard 40 for powering the extensible cable holders 30. A separate extensible cable holder 30 is dedicated for each cable 28 and lengthens and shortens the cables 28 independent of each other. Before the user attaches each cable 28 to the posts 20 positioned on the back end 16 of the bed 12, the user adjusts the height of each post 20 at the back end 16 of the bed 12 above the height of the load 18. This may entail adjusting the height of the sliding latch pin 74 or simply using the loop 39 positioned on the top of each back post 20. Each extensible cable holder 30 is put into a free wheeling mode wherein each cable 28 is permitted to unspool freely from its respective extensible cable holder 30. The user may then use steps 80 positioned on the front of the headboard 40 to climb up to the post 20 positioned on the headboard 40. The user then releases the releasable catch 38 from the headboard 40 and creates enough slack in each cable 28 to extend the cable 28 to a reachable height for one standing on the ground next to the bed 12. The user is then permitted to pull the cable 28 along the side of the bed 12 to the back end 16 of the bed 12. The releasable catch 38 is then positioned through the receiver loop 39 on the post 20 positioned on the back end 16 of the bed 12. In the case where the sliding latch pin 74 is being used, the releasable catch 38 is attached through the sliding latch pin 74 attached to the post 20 at the back end 16 of the bed 12. With each cable 28 attached to a post 20 at the back end 16 of the bed 12, each post 20 at the front end 14 of the bed 12 is ready to be positioned at a height above the load 18. To move the telescoping member 24 relative to the fixed member 22 on each post 20 at the front end 14 of the bed 12, the latch pin 62 is locked in the open position to permit the telescoping member 24 to be adjusted upward or downward. The telescoping member 24 is adjusted relative to the fixed member 22 above the height of a load 18 using the self-braking crank 46. The safety latch pin 62 is released and moved to the closed position and permitted to lock the telescoping member 24 when the user has positioned the telescoping member 24 at a height above the load 18 and corresponding to the height of each post 20 positioned at the back end 16 of the bed 12. Once the height of the posts 20 have been positioned above the load 18, the weather cover 66 is removed from on top of the U-shaped tarpaulin 32 positioned on the tarpaulin storage shelf 64 in the stowed position 33 (as shown in FIG. 3). The weather cover 66 is removed by pulling retaining pin 68 from retaining pin bracket 72 and allowing the weather cover 66 to release the U-shaped tarpaulin 32 from off the tarpaulin storage shelf 64 in the stowed position 33 (as shown in FIG. 3). The weather cover 66 may be pinned to the brackets 72 positioned below the tarpaulin shelf 64. Additionally, straps 37 are removed from the sides of the U-shaped tarpaulin 32 to release the tarpaulin 32 from the headboard 40. Each extensible cable holder 30 is operated independently of the other and moved to the power position to raise the cable 28 above the load 18 to the height of each post 20 positioned at the front end 14 and the back end 16 of the bed 12. Each cable 28 is tightened using each extensible cable holder 30 until the cable 28 is taunt between the front end 14 and back end 16 posts 20. With the help of the eyes or pulleys 34 slidably connecting the U-shaped tarpaulin 32 to each cable 28, the U-shaped tarpaulin 32 is removed from the stowed position 33 (as shown in FIG. 3) and pulled from the front end 14 rearward to the back end 16 of the bed 12 to the covering position 31. In the case where the U-shaped tarpaulin 32 drags on the load 18 while moving the tarpaulin 32 from the front end 14 to the back end 16 and the bed 12 the user may release the tension on each cable 28 using each independent extensible cable holder 30 and raise the front end 14 and back end 16 posts 20 to a height above the load 18. In the case where the load 18 is only a partial load, the U-shaped tarpaulin 32 is drawn across the partial load (see FIG. 8). With the U-shaped tarpaulin 32 in the covering position 31 each extensible cable holder 30 is operated independently to lower each cable 28 to the height of the load 18. Thus, each cable 28 is lowered below the height of the posts 20 at the front 14 and the back end 16 of the bed 12 to the height of the load 18. Elastic straps or tie downs 37 are used to secure the U-shaped tarpaulin 32 to the rails 13 on the bed 12. When at a destination or load drop-off point, if only a portion of the load 18 is being unloaded from the bed 12, the user releases or removes the straps 37 from the side of the bed 12 to be unloaded. Using the extensible cable holder 30 associated with the side to be unloaded, the user raises the cable 28 to lift up the specific side of the U-shaped tarpaulin 32 from off of the load 18. The user then pulls the side raiser ropes 36 on the opposite side of the U-shaped tarpaulin 32 from where the load 18 is being removed from off of the bed 12. Pulling the side raiser ropes 36 exposes the load 18. Pulling the side raiser ropes 36 also raises the side of the U-shaped tarpaulin 32 to the height of the raised cable 28. In the event that all of the load 18 is being removed from the bed, all straps 37 are removed, each cable 28 is tightened and the U-shaped tarpaulin 32 is lifted off the top of the load 18 to the covering position 31. The U-shaped tarpaulin 32 is then moved from the covering position 31 to the stowed position 33 (as shown in FIG. 3) so as to allow access to the entire load 18 positioned on the bed 12. In the case where the user is making frequent stops to unload portions of the load 18 from the bed 12, one side of the U-shaped tarpaulin 32 may be raised to the covering position 31 above the height of the load 18 to permit access and removing of that portion of the load 18 from the bed 12. Subsequently, the raised cable 28 is lowered below the height of the post again to a position on top of the load 18 and the U-shaped tarpaulin 32 is resecured to the railing 13 on the bed 12 using the straps 37. In its preferred embodiment, the tarpaulin system 32, allows the user to quickly expose, uncover and remove that portion of the load 18 that is being unloaded from the bed 12 without requiring the U-shaped tarpaulin 32 from being removed entirely from off the top of the load 18 to the stowed position 33 (as shown in FIG. 3). Thus, in the case where the user is making frequent stops to unload only a portion of the load 18 at each stop, the U-shaped tarpaulin 32 is capable of being raised over only that portion which is being unloaded and quickly resecured for a quick, efficient and safe distribution of a load 18 to multiple destination points.

The preferred embodiment of the present invention has been set forth in the drawings and specification, and although specific terms are employed, these are used in a generic or descriptive sense only and are not used for the purposes of limitation. Changes in the form and proportion of parts as well as in the substitution of equivalents are contemplated as circumstances may suggest or render expedient without departing from the spirit and scope of the invention as further defined in the following claims.

What is claimed is:

1. A tarpaulin system for quick and safe covering of a load on a truck or trailer bed having a front and opposite back end, the system comprising:
    a post positioned at each corner of the bed;
    a pulley mounted on top of each post at the front of the bed;
    a pair of cables each anchored at one end to an extensible cable holder, trained over the pulley, and removably attached to the post on the back of the bed;
    a U-shape tarpaulin having a plurality of eyes for slidably connecting to the cables in a covering position over the load or a stowed position.

2. The tarpaulin system of claim 1 wherein each post on the front of the bed further comprise a fixed member for attaching to the bed and a telescoping member with a rack attached thereto.

3. The tarpaulin system of claim 2 further comprises a self-braking crank having a handle connected to a shaft and a pinion secured on the shaft for driving the rack and extending the telescoping member relative to the fixed member.

4. The tarpaulin system of claim 3 wherein the self-braking crank further comprises a nut secured to the handle for threading the handle onto the shaft and a plurality of friction discs mounted on the shaft, the discs being compressed together by the nut to brake the handle when positioning the telescoping member.

5. The tarpaulin system of claim 4 wherein each telescoping member on the front of the bed further comprise a plurality of holes spaced along the member for receiving a bolt of a safety latch pin attached to the fixed member.

6. The tarpaulin system of claim 5 wherein each post on the back of the bed further comprise a plurality of holes spaced along the post for receiving a sliding latch pin.

7. The tarpaulin system of claim 6 wherein one end of each cable is removably attached at the back of the bed to the sliding latch pin or a receiver loop atop each post.

8. The tarpaulin system of claim 7 wherein the sliding latch pin and attached cables being moveable to a covering position above the load using the plurality of holes.

9. The tarpaulin system of claim 8 further comprises a headboard positioned between the posts on the front of the bed, the headboard further comprises a shelf for holding the tarpaulin in the stowed position.

10. The tarpaulin system of claim 9 further comprises a pair of extensible cable holders for independently lengthening and shortening the pair of cables.

11. A tarpaulin system for quick and safe covering of a load on a truck or trailer bed having a front and opposite back end, the system comprising:
    a first pair of posts on the front end of the bed adapted for adjustment to a first position above the load;
    a first and second cable each independently anchored at the front end of the bed to an extensible cable holder, trained over a pulley atop each post at the front of the bed and removably secured at the back end of the bed to a second pair of posts adjustable to the first position above the load;
    a U-shape tarpaulin having a plurality of eyes slidably connected to the first and second cables in a covering position over the load or a stowed position; and
    the first and second cable and tarpaulin adjustable from the first position above the load to a second resting position on top of the load using the extensible cable holders.

12. The tarpaulin system of claim 11 wherein each post on the front of the bed further comprise a fixed member for attaching to the bed and a telescoping member with a rack attached thereto.

13. The tarpaulin system of claim 12 further comprising a self-braking crank and a handle having a shaft and a pinion attached to the shaft for driving the rack and extending the telescoping member relative to the fixed member to the first position above the load.

14. The tarpaulin system of claim 13 wherein the self-braking crank further comprises a nut secured to the handle and threaded onto the shaft and a plurality of friction discs mounted on the shaft, the discs being compressed together by the nut to brake the handle when rotating the handle to position the telescoping member.

15. The tarpaulin system of claim 14 wherein the first cable is connected to and independently driven by a first extensible cable holder and the second cable is connected to and independently driven by a second extensible cable holder.

16. The tarpaulin system of claim 15 wherein the first cable and/or the second cable being adjustable from the second position to the first position for uncovering at least some of the load.

17. The tarpaulin system of claim 16 wherein the U-shape tarpaulin further comprises a plurality of side raiser ropes for raising at least one side of the tarpaulin to the first position above the load for accessing and removing the load from the bed.

18. A method for quick and safe covering and uncovering of a load on a truck or trailer bed having a front and opposite back end using a tarpaulin, the method comprising:
    providing an adjustable post positioned at each corner of the bed;
    mounting a pulley atop of each adjustable post at the front of the bed;
    adjusting each post above the load;

anchoring a pair of cables each at one end to an extensible cable holder, training over the pulley, and removably attaching an opposite end of each cable to the posts on the back end of the bed;

sliding a U-shape tarpaulin having a plurality of eyes for connecting to the pair of cables to a covering position over the load; and lowering the pair of cables below the adjustable posts for resting the tarpaulin on top of the load in covering relation to the load.

19. The method of claim 18 further comprising raising at least one of the pair of cables from off top of the load for lifting the tarpaulin above the load.

20. The method of claim 19 further comprising raising at least one side raiser rope associated with the tarpaulin for raising the tarpaulin above the load to uncover, access and remove at least some of the load from the bed.

21. The method of claim 20 further comprising raising and lowering each cable independent of the other using separate extensible cable holders.

* * * * *